United States Patent [19]

Turner et al.

[11] 4,036,179
[45] July 19, 1977

[54] ANIMAL PROTECTOR

[76] Inventors: James E. Turner; Louise L. Turner, both of 15346 25th NE., Seattle, Wash. 98155

[21] Appl. No.: 674,405

[22] Filed: Apr. 7, 1976

[51] Int. Cl.² ............................................. A01K 29/00
[52] U.S. Cl. .................................................... 119/96
[58] Field of Search .................... 119/143, 106, 96; 128/171, 132 R; 54/79, 80, 71; 9/336, 337, 338, 339, 340

[56] References Cited

U.S. PATENT DOCUMENTS

| 295,712 | 3/1884 | Anderson | 54/80 |
|---|---|---|---|
| 3,013,530 | 12/1961 | Zeman | 119/106 |
| 3,579,683 | 5/1971 | Robertson | 9/340 |
| 3,942,306 | 3/1976 | Kulka | 119/106 |

Primary Examiner—Hugh R. Chamblee
Attorney, Agent, or Firm—Seed, Berry, Vernon & Baynham

[57] ABSTRACT

A substantially thick, resilient pad is bent around the neck of an animal and secured to the body of the animal with straps. The thickness of the pad prevents the animal from reaching the chest, back, belly and rear extremities of the animal with his mouth to prevent damage to injuries and surgical areas on the animal. The resilient pad preferably extends a substantial distance along the length of the animal and can serve as a protector for the animal when in a vehicle or the like.

4 Claims, 3 Drawing Figures

ANIMAL PROTECTOR

BACKGROUND OF THE INVENTION

1. Field of the Invention

This invention pertains to animal protectors of the type which prevent the animal from reaching parts of his body as well as cushioning the animal in a cage or while in a vehicle.

2. Description of the Prior Art

Prior art animal protectors such as shown in U.S. Pat. No. 3,036,554 have taken the form of a plastic or rubber circular plate that is fitted around the neck of the animal. Such a plate, which in some cases prevents the animal from reaching areas of his body where surgery is healing, have the disadvantage of being extremely uncomfortable for the animal. The animal wearing such a plate has difficulty reaching food from his normal upright eating position and has difficulty lying down to rest. The animal also can use his hind paws to push the collar off his neck.

SUMMARY OF THE INVENTION

It is an object of this invention to provide an animal protector which prevents the animal from reaching injuries or surgical repairs without substantially inhibiting its sleeping, eating and playing activities.

It is another object of this invention to provide an animal protector that protects the chest and sides of the animal from injuries caused during traveling.

Basically, these objects are obtained by an elongated, substantially thick, resilient pad having a bent central portion connecting with two spaced substantially parallel end portions. The end portions are connected by straps which span above and below the end portions to form a body-receiving cavity therebetween. Preferably, the straps are releasable and adjustable to enable the pad to be fitted over the head of the animal. The substantial thickness of the central portion prevents the animal's mouth from reaching the chest, belly, back and rear extremities so that it is difficult for the animal to lick or otherwise damage injured or surgically repaired areas.

In the preferred embodiment, the end portions of the pad extend back to the rear of the rib cage close in front of the rear legs to provide side protection for the animal and to inhibit the animal from getting its hind paws or snout beneath the pad in a manner which would enable the animal to force the pad off or tear it.

The thickness of the pad can be varied depending upon the size and weight of the animal. For example, it can be sized to fit a very small animal such as a 20 pound dog to a very large animal such as a horse or cow. The pad being resilient is comfortable on the animal and, while restricting downward bending of the head, still leaves the animal free for normal upright eating positions and for lying down.

DETAILED DESCRIPTION OF THE PREFERRED EMBODIMENTS

Figure 1:
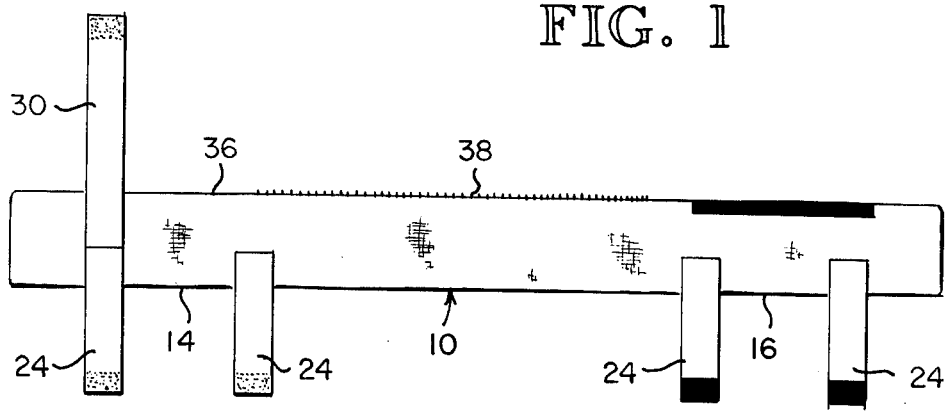
FIG. 1 is a rear side elevaton of one embodiment of the invention in its opened condition.
Figure 2:
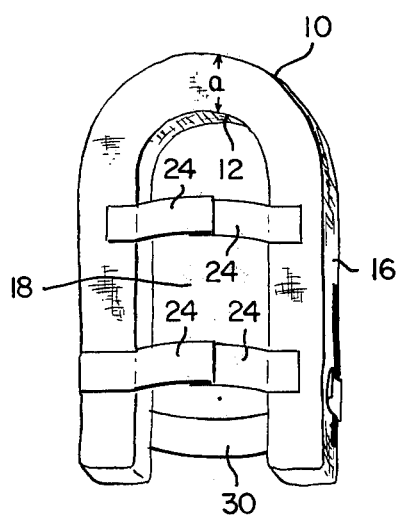
FIG. 2 is a top plan of the protector shown in FIG. 1 in its configuration suitable for being carried on the animal.

As best shown in FIG. 1, the protector includes an elongated, resilient pad 10 of polyurethane or rubber foam, or other suitable lightweight, resilient material having a substantial thickness in the direction of (FIG. 2). The weight and resiliency of the pad reduce the chance of wearing sores and minimize pressure on chest and side wounds. The pad is of substantial length having a bent central portion 12 and parallel spaced end portions 14 and 16. In the configuration shown in FIG. 2, the spaced end portions form a cavity 18 for receiving the animal.

The end portions are connected together by a pair of straps 20 and 22 which span above the cavity 18 and are adapted to ride on the back of the animal. In the preferred embodiment, these straps are each formed by a short strips 24 which are joined in the position shown in FIG. 2 by Velcro tape or other suitable fasteners. An additional strap 30 spans between the end portions below the cavity 18 and also is connected with Velcro tape or other suitable fastener. While the preferred embodiment shows a strap 30 of a small width, the strap can also be made of a non-irritating material and extend a substantial width over the belly of the animal to cover the belly wounds and thus restrict the animal from scratching the wound with its paws.

The end portions 14 and 16 are at least as long as the bent central portion in the preferred embodiment to allow the end portions to extend rearwardly when on an animal to the end of the rib cage or just forward of the rear hip. This length provides additional side protection for the animal and since the terminal ends of the end portions are out of reach of the hind paws and the snout, it is difficult for the animal to push the pad around on or off its body.

An important feature of the invention is that the thickness a of the pad is sized to the size of the animal so that it is of sufficient thickness to inhibit the animal from bending its head downwardly to reach its chest or to prevent the animal, when it twists its head, to reach the belly or hind extremities. In one example, the thickness a is three inches for a five-inch high pad for use on an animal between 40 to 70 pounds. A 50-inch long pad is also used for this example. It should be understood, therefor, that for a horse, the thickness will be substantially greater as will be the length and height of the pad but the functional relationship of the pad to the animal will remain the same.

In the preferred embodiment, the pad is provided with a cover 36 having a zipper 38 which allows easy removal for cleaning. In the alternative, the cover can be made of a water-impermeable fabric, such as vinyl plastic.

Figure 3:
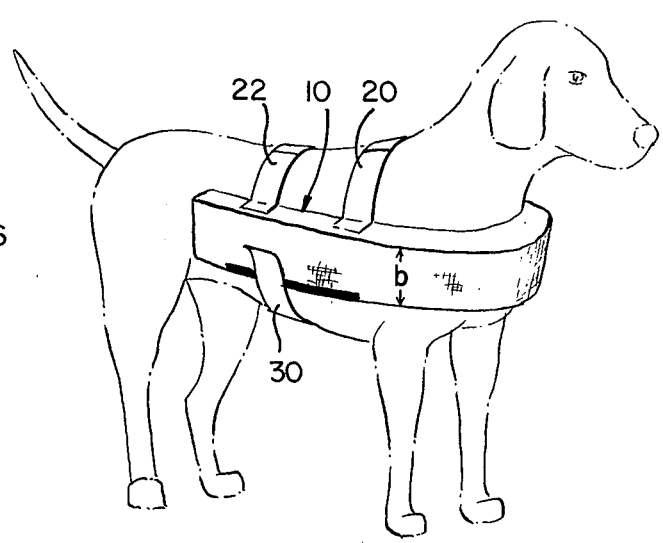
FIG. 3 illustrates the protector carried on an animal such as a dog.

In use, the pad is placed around the chest of the animal and the straps secured in a comfortable fit such as shown in FIG. 3. The pad can then be easily removed for cleaning or when no longer used by opening the fasteners on the straps.

While the preferred embodiments of the invention have been illustrated and described, it should be understood the variations will be apparent to one skilled in the art without departing from the principles herein. Accordingly, the invention is not to be limited to the specific embodiments illustrated.

The embodiments of the invention in which a particular property or privilege is claimed are defined as follows:

1. A protector to inhibit an animal from reaching parts of the body, comprising:
resilient pad means of sufficient height and thickness for preventing an animal from moving his mouth to the chest, abdomen and rear extremities, and
means for securing the pad means to the animal,
said pad means including an elongated resilient foam pad having opposite ends and a central portion, said securing means including upper and lower straps attached to the pad means and spaced from said central portion to form a neck-receiving opening, at least one of said straps connected above the pad to rest on the animal's back, and another of the straps attached to the pad to span between the two ends of the pad beneath the animal.

2. A protector to inhibit an animal from reaching parts of the body, comprising:
resilient pad means of sufficient height and thickness for preventing an animal from moving his mouth to the chest, abdomen and rear extremities, and
means for securing the pad means to the animal,
said resilient pad means including an elongated pad having a bent central portion and a pair of end portions extending from said central portion with each end portion being at least the length of the bent central portion whereby the end portions are adapted to lie along the sides of the animal and terminate at approximately the rear end of the animal's rib cage,
said securing means including at least two upper straps connected between said end portions and spanning above said pad, and a lower strap connected between said pad end portions and spanning below said pad.

3. An animlal protector, comprising:
an elongated, resilient pad having a horizontal upper wall,
a horizontal lower wall, vertical end walls, a bent central portion connected to parallel spaced end portions terminating at said end walls and defining a cavity therebetween, upper strap means connected between the parallel spaced end portions and spanning over said cavity, and lower strap means connected between the parallel spaced end portions and spanning below said cavity whereby the pad is adapted to be suspended around an animal's neck with the upper strap means riding on the animal's back and the lower strap means riding on the animal's belly,
said pad having a thickness sufficient to prevent the animal's mouth from reaching the belly, back and rear extremities of the animal.

4. The protector of claim 3, said thickness being approximately 3/5 the dimension of the height of the pad.

* * * * *